Figure 1:
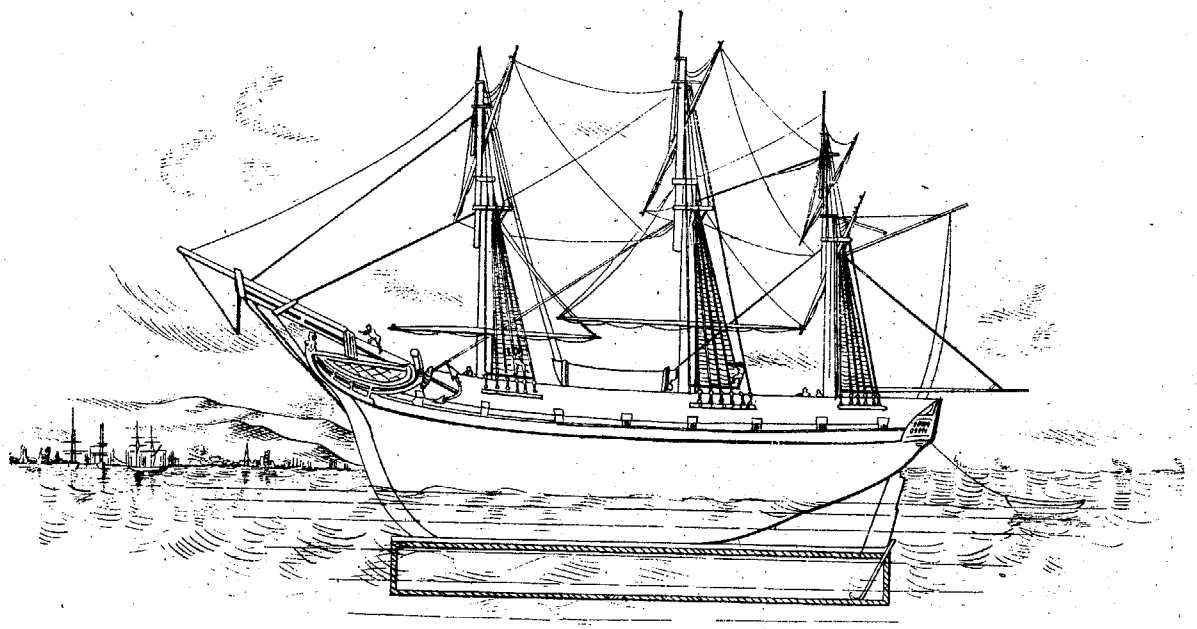
Figure 1:
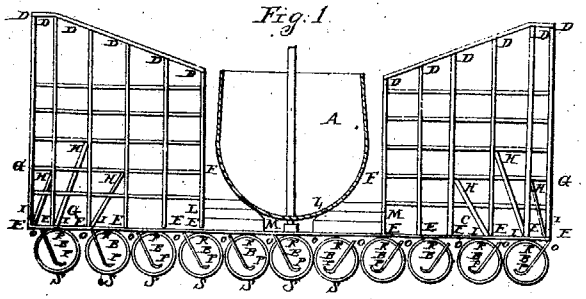

2 Sheets: Sheet 1.

9268X

Cambell & Withington,
Camel & Floating Dock.

Patented Nov 26, 1835.

2 Sheets. Sheet 2.
9268X
Cambell & Withington,
Camel & Floating Dock.
Patented Nov. 26, 1835.
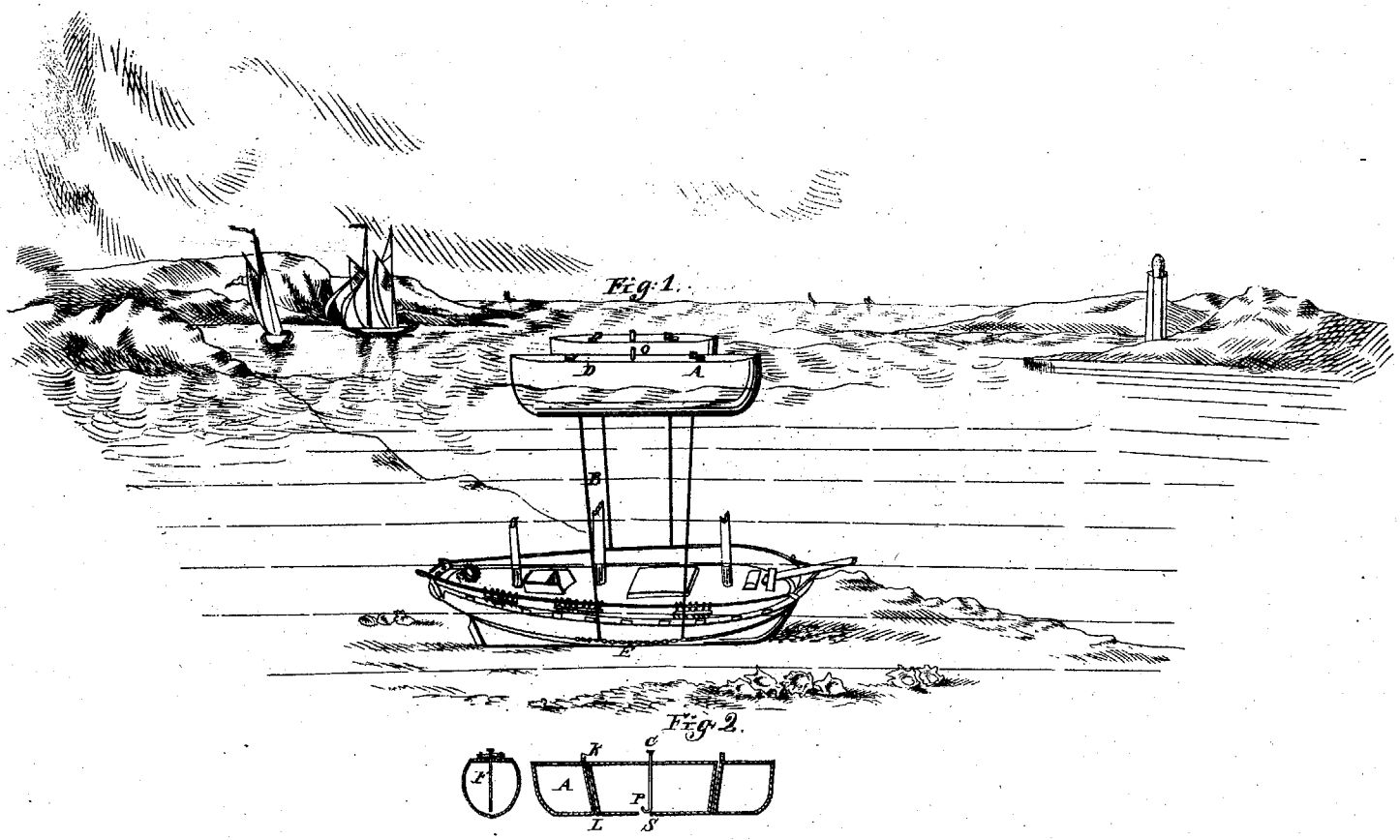

9268 Nov 25, 1835

John R Campbell and Thomas S Wellington of Boston Mass

Letters Patent

The Schedule referred to in these Letters Patent and making part of
the same containing a description in the words of the said John
Reed Campbell and Thomas Sturman Wellington themselves of
their improvement in the floating Dry Dock for raising Vessels To all persons to whom these presents shall come, Be it known
that we John Reed Campbell and Thomas Sturman Wellington
both of Boston in the County of Suffolk and Commonwealth
of Massachusetts have invented a new and useful machine cal-
led a marine Floating Apparatus and that the following is
a full and exact description thereof. The objects to which the
apparatus can be applied are chiefly to raise sunken vessels [illegible] vessels or
those that have been stranded, to lighten vessels over shoals,
and also to raise Vessels out of the water for repairing. These
objects are effected by sinking hollow Boats or casks filled with
water and attached to the object to be raised and then expelling
the water by a forcing pump from the boats or casks and sup-
plying its place with air when they will raise a weight equal
to the amount of water expelled less the weight of the air, all
which may be done in the following manner.
The drawing herewith annexed at plate 1 Fig 1. represents a
sunken Ship with a hollow boat A attached to it, to be made
of wood, India Rubber cloth, or any other suitable substance. One
such Boat is represented in the drawing as attached to the vessel
but two can be used attached to each side of the vessel, and
even more if necessary. Fig 2 represents another boat of the
same kind. These Boats must be built for the purpose of
sufficient strength and tightness to be confined in safety
under the water. D is a windlass. K L is a well running
through the boat in which C a cable is passed through after
it has been run round the sunken ship and clapped [illegible]

9268X a [illegible] E. The cable is then made fast to the windlass
[illegible]
D. then one air valve M. is opened and the water let into the
Boats at D. which is an open hole in the bottom of the boat.
The Boats can then be drawn down to the depth required. C F.
is a tube which stands a little above the top of the boats and
runs down to the bottom where it turns up with a valve
on the end opening outwards with a valve at the upper end
C. and a force pump or Bellows attached to it. Then shut
the valve C and start the pump and the air will rise from
the end of the tube P and fill the Boats with air. They
will then raise the amount of weight of the water displaced.
Another tube can be screwed on at E whenever necessary to leng-
en the tube. Plate 2. represents the mode of raising Ships out
of the water for repairing. A represents a Ship B.B.B. &c
a number of round casks or Boats of such dimensions as
may be required. These represented are supposed to be five
feet in diameter and one hundred feet long. C.C. is a platform
over these boats. D.E. D.E. &c are upright posts with ten-
nants into the horizontal timber which can be moved if re-
quired for a larger or smaller vessel. F.G. F.G. is a staging to
work upon. H.I. H.I. &c are Braces. L.M. L.M. are cra-
dle blocks. O.P. O.P. &c are pipes as in Plate 1 passing th[illegible]
the casks or Boats and additional tube may be attached to
them when required as described in plate 1. with a valve, and
force pump at the upper end of the tube. In order to
sink the casks or Boats. the air valves R.R.R. &c should
be opened and the boats, and platform will sink low
enough to allow of their being pushed under the vessel. then
by working the pump the air will press the water out at
S. and the Ships will be hoisted out of water as represen-
ted in plate 2. Fig 1. We claim as our invention and
as not having been previously used or known, the machine
or apparatus herein described, as combined together for

9268X the purposes before mentioned. In testimony that the above is a true specification of our said invention We have hereunto set our Hands this twenty second day of June A D eighteen hundred and thirty five Witnesses
H.G. Sewell
W.C. Campbell J. R. Campbell
J. S. Willington (8 Sheets) (Drawing.)